United States Patent [19]

Pipper et al.

[11] Patent Number: 5,674,973
[45] Date of Patent: Oct. 7, 1997

[54] CONTINUOUS PRODUCTION OF LOW MOLECULAR WEIGHT POLYAMIDES

[75] Inventors: Gunter Pipper, Bad Duerkheim; Andreas Kleinke, Ludwigshafen; Peter Hildenbrand, Karlsruhe, all of Germany

[73] Assignee: BASF Aktiengesellschaft, Ludwigshafen, Germany

[21] Appl. No.: 578,703
[22] PCT Filed: Jun. 20, 1994
[86] PCT No.: PCT/EP94/01998
§ 371 Date: Dec. 28, 1995
§ 102(e) Date: Dec. 28, 1995
[87] PCT Pub. No.: WO95/01389
PCT Pub. Date: Jan. 12, 1995

[30] Foreign Application Priority Data

Jun. 20, 1994 [DE] Germany .......... 43 21 683.8

[51] Int. Cl.[6] ........... C08G 69/14; C08G 69/26; C08G 69/28
[52] U.S. Cl. .......... 528/323; 528/325; 528/326; 528/335; 528/336; 528/339; 528/340; 528/347; 528/348
[58] Field of Search ............ 528/320, 348, 528/347, 325, 326, 335, 336, 339, 340

[56] References Cited

U.S. PATENT DOCUMENTS 4,049,638  9/1977  Doerfel et al. .................. 528/335

FOREIGN PATENT DOCUMENTS

| 284 968 | 10/1988 | European Pat. Off. . |
| 530 592 | 3/1993 | European Pat. Off. . |
| 24 43 566 | 4/1976 | Germany . |
| 206 999 | 2/1984 | Germany . |

*Primary Examiner*—Samuel A. Acquah
*Assistant Examiner*—P. Hampton Hightower
*Attorney, Agent, or Firm*—Keil & Weinkauf

[57] ABSTRACT

A process for the continuous production of polyamides from a mixture of at least one lactam and water and, if required, other monomer units and/or conventional additives and fillers under polyamide-forming conditions, where the mixture of the starting materials is heated in liquid phase in a first reaction zone until a conversion of at least 70% is reached, and undergoes adiabatic decompression and further polymerization in another reaction zone, wherein, in the first reaction zone, 0.5–7% by weight of water are employed, the temperature is increased to the range from 220° to 310° C., and polymerization is carried out until a conversion of at least 85% is reached and, in the second reaction zone, after the decompression further polymerization is carried out in the range from 215° to 300° C. without heat input.

13 Claims, No Drawings

CONTINUOUS PRODUCTION OF LOW MOLECULAR WEIGHT POLYAMIDES

This application is a 371 of PCT/EP 94/01998 Jun. 20, 1994.

BACKGROUND OF THE INVENTION

1. Field of the Invention

The present invention relates to an improved process for the continuous production of polyamides from a mixture of at least one lactam and water and, if required, other monomer units and/or conventional additives and fillers under polyamide-forming conditions, where the mixture of the starting materials is heated in liquid phase in a first reaction zone until a conversion of at least 70% is reached, and undergoes adiabatic decompression and further polymerization in another reaction zone.

The invention also relates to low molecular weight polycaprolactam having a molecular weight in the range from 3000 to 1400 g/mol, to the use of this polycaprolactam for the production of granular polycaprolactam and high molecular weight polycaprolactam, and to a process for producing high molecular weight polycaprolactam from this low molecular weight polycaprolactam.

2. Description of the Related Art

DE-A 24 43 566 describes a process for the continuous production of polyamides by progressive movement of a mixture of one or more lactams and 1–15% by weight of water and, where appropriate, other polyamide-forming compounds, in which the mixture of the starting materials is heated in a first reaction zone to 210°–330° C., and the polycondensation mixture is adiabatically decompressed in another reaction zone and subsequently polymerization is completed in further reaction stages to give high molecular weight polyamides, where a) the mixture of the starting materials in the first reaction zone is heated under pressures which are above the appropriate vapor pressures of the starting materials and prevent the formation of a vapor phase for from 5 minutes to 2 hours, preferably 10 minutes to 1 hour, until a conversion of at least 70%, and preferably 80%, is reached;

b) the polycondensation mixture is decompressed in the second zone to pressures of 1–11 bar, preferably 1–6 bar, and immediately thereafter is heated in a third reaction zone, preferably together with the steam formed in the decompression, with input of heat and evaporation of most of the water under the pressure after decompression or a lower pressure, within less than 10 minutes, preferably less than 5 minutes, to 250°–350° C., preferably 260°–280° C., and c) the polymerization mixture is separated from the water vapor in a fourth reaction zone and polymerization is completed in further reaction stages to give high molecular weight polyamides.

However, the disadvantage of this process is that the melt viscosity of the resulting polycaprolactam is too high. Thus, a high melt viscosity usually gives rise to problems in conveying the melt and dissipating the heat of reaction. These problems usually result in caking within the reactor system which leads, inter alia, to reductions in quality. Furthermore, the space-time yield of the process disclosed in DE-A 24 43 566 is too low. In addition, low molecular weight polycaprolactam cannot be obtained with a conversion of more than 85% as disclosed in DE-A 24 43 566.

It is an object of the present invention to provide an improved process for producing polyamides which does not have these disadvantages.

SUMMARY OF THE INVENTION

We have found that this improved process for producing polyamides is achieved by a process for the continuous production of polyamides from a mixture of at least one lactam and water and, if required, other monomer units and/or conventional additives and fillers under polyamide-forming conditions, where the mixture of the starting materials is heated in liquid phase in a first reaction zone until a conversion of at least 70% is reached, and undergoes adiabatic decompression and further polymerization in another reaction zone, wherein, in the first reaction zone, 0.5–7% by weight of water are employed, the temperature is increased to the range from 220° to 310° C., and polymerization is carried out until a conversion of at least 85% is reached and, in the second reaction zone, after the decompression further polymerization is carried out in the range from 215° to 300° C. without heat input.

We have furthermore found low molecular weight polycaprolactam having a molecular weight in the range from 3000 to 14000 g/mol, the use of this polycaprolactam for the production of granular polycaprolactam and high molecular weight polycaprolactam, and a process for the production of high molecular weight polycaprolactam from this low molecular weight polycaprolactam.

It is possible to use as lactam, for example, caprolactam, enantholactam, caprylolactam and laurolactam as well as mixtures thereof, preferably caprolactam.

Examples of further monomer units which can be employed are dicarboxylic acids such as alkanedicarboxylic acids having 6–12 carbon atoms, in particular 6–10 carbon atoms, such as adipic acid, pimelic acid, suberic acid, azelaic acid or sebacic acid as well as terephthalic acid and isophthalic acid, diamines such as $C_4$–$C_{12}$-alkylenediamines, in particular having 4–8 carbon atoms, such as hexamethylenediamine, tetramethylenediamine or octamethylenediamine, also m-xylylenediamine, bis(4-aminophenyl))methane, 2,2-bis(4-aminophenyl)propane or bis(4-aminocyclohexyl)methane, as well as mixtures of dicarboxylic acids and diamines, each in any desired combinations, but preferably in the equivalent ratio to one another such as hexamethylenediammonium adipate, hexamethylenediammonium terephthalate or tetramethylenediammonium adipate, preferably hexamethylenediammonium adipate and hexamethylenediammonium terephthalate, in amounts in the range from 0 to 60, preferably from 10 to 50% of the total weight of monomers. Now of special industrial importance are polycaprolactam and polyamides composed of caprolactam, hexamethylenediamine and adipic acid, isophthalic acid and/or terephthalic acid.

DESCRIPTION OF THE PREFERRED EMBODIMENTS

In a preferred embodiment, caprolactam and hexamethylenediammonium adipate (AH salt) are employed, the AH salt being in the form of an aqueous solution. The molar ratio of caprolactam to AH salt is normally chosen to be in the range from 99.95:0.05 to 80:20, preferably from 95:5 to 85:15.

Conventional additives and fillers which can be employed are pigments such as titanium dioxide, silicon dioxide or talc, chain regulators such as aliphatic and aromatic carboxylic and dicarboxylic acids such as propionic acid or terephthalic acid, stabilizers such as copper(I) halides and alkali metal halides, nucleating agents such as magnesium silicate or boron nitride, catalysts such as phosphorous acid and antioxidants in amounts in the range from 0 to 5, preferably from 0.05 to 1, % of the total weight of monomers. The additives are usually added before the granulation and before, during or after, preferably after, the polymerization.

The process according to the invention is usually carried out in such a way that a mixture of lactam and 0.5–7, preferably 1–4.5, particularly preferably 2–3, % by weight of water, which is expediently preheated to 75°–90° C., is introduced into a reaction vessel, and the mixture is then heated to 220–310, preferably 240°–290° C.

The reaction vessel advantageously contains fittings such as arranged mixing elements (e.g. Sulzer packings) or dumped mixing elements (e.g. Raschig rings, beads or Pall rings) so that preferably a minimum residence time of the monomers in the melt is ensured (to achieve a high conversion) and zones where there is only minimal or no transport of the melt (dead zones) and back-mixing are avoided where possible.

The reaction pressure is chosen according to the invention so that the mixture is in the form of a single liquid phase. This is advantageous because the development of gas cushions generally causes pulsatile flow which would result in back-mixing and non-uniform polymerization. The pressure is in the range from 5 to 30, preferably from 8 to 18, bar (absolute).

The residence time, which depends essentially on the temperature, pressure and water content of the reaction mixture, is chosen according to the invention to be in the range from 2 to 4 h, preferably from 2 to 2.5 h. The conversions obtained with reaction times of less than 2 h and a water content below 1% by weight are generally less than 86%. Reaction times of more than 4 h generally result in poor space-time yields, and this is also associated with larger and more technically elaborate reactors.

The use of caprolactam in the process according to the invention normally results, after the first reaction zone, in a polycaprolactam having a molecular weight in the range from 3000 to 9000, preferably from 5000 to 6700, g/mol. The total end-group concentration in this case is generally in the range from 220 to 670, preferably from 300 to 400, mmol/kg, and the melt viscosity is in the range from 100 to 10000, preferably from 200 to 4000 mPas (at 270° C.).

The conversion (calculated from the extract content, where conversion=100−extract content)

is, according to the invention, at least 85%, preferably greater than or equal to 87%, particularly preferably greater than or equal to 89%.

The reaction mixture which is under pressure is subjected according to the invention to an adiabatic decompression, ie. a decompression in which the heat required for vaporization is not supplied from outside, in a second reaction zone in which the pressure is usually chosen to be in the range from 0.1 mbar to 1.1 bar, preferably in the range from 500 to 1050 mbar. During this the mixture from the first reaction zone is generally cooled to 215°–300° C., preferably 235°–265° C.

It is furthermore expedient to remove with the water vapor the volatiles such as the lactam and other monomer units as well as steam-volatile oligomers thereof in the second reaction zone. In another preferred embodiment, the volatiles are continuously returned quantitatively to the process, ie. preferably to the first reaction zone.

The residence time in the second reaction zone is generally chosen in the range from 2 to 60 minutes, preferably from 3 to 30 minutes.

The use of caprolactam in the process according to the invention usually results after the second reaction zone in a polycaprolactam having a molecular weight in the range from 3000 to 14000, preferably from 6000 to 12000, g/mol. The total end-group concentration is generally in the range from 140 to 670, preferably from 170 to 330, mmol/kg, and the melt viscosity is in the range from 100 to 10000, preferably from 200 to 4000 mPas (at 270° C.).

As a rule, the polycaprolactam obtained after the second reaction zone can be converted into granules by conventional methods, for example by discharging the polymer melt in the form of profiles and subsequently passing through a waterbath and thus cooling, and then granulating.

The polycaprolactam obtained according to the invention can be extracted by conventional methods and subsequently or simultaneously be converted into high molecular weight polycaprolactam.

For example, the polycaprolactam according to the invention can be subjected to countercurrent extraction with water (see DD-A 206999). The required viscosity number of the final product, which is usually in the range from 140 to 350 ml/g, can be adjusted in a conventional way by drying or by polycondensation on heat-treatment in solid phase.

Another possibility for the further processing is gas-phase extraction (see EP-A 284968) with a simultaneous increase in molecular weight, it being possible to carry out simultaneous extraction and heat-treatment with superheated steam. The required viscosity number of the final product in this way is generally in the range from 140 to 350 ml/g.

The advantages of the process according to the invention compared with known processes are, inter alia, that the extract content and the melt viscosity of the polyamide produced according to the invention are low.

At the same time, the fact that extraction is carried out on the low molecular weight polyamide, and not on the high molecular weight polyamide, markedly reduces both the extraction time and the total time for producing the polyamides, and thus a high space-time yield is achieved.

In addition there is optimal technical utilization of the heat of the processes in both reaction zones. It may be mentioned by way of example (with reference to DE-A 24 43 566) that the heat released in the reaction is utilized to heat the first reaction zone, and the heat input which is normally necessary in the second reaction zone is omitted. Furthermore, the polymers obtainable according to the invention are, because of their relatively low molecular weight combined with their high total end-group concentration, very reactive, which is advantageous for further processing. Examples thereof are the reactive binding of the polyamide according to the invention to fillers such as glass fibers and other additives and the production of block copolymers by mixing with other polymers in the molten state.

EXAMPLES

Carboxyl end-group determinations were carried out by acidimetric titration (in duplicate). To do this, initially the blank and factor were determined, and then the measurement was repeated with the polyamide to be investigated and, from this, the end-group content was found.

The blank was determined by refluxing 30 ml of distilled benzyl alcohol on a hot plate with the addition of a few glass beads for 15 minutes and then, after addition of 6 drops of indicator (50 mg of cresol red dissolved in 50 ml of analytical grade n-propanol, it was titrated with the titration solution (80 ml of 0.5M methanolic KOH solution/860 ml of n-propanol made up to 2000 ml with hexanol) until the color changed from yellow to gray.

The factor was determined by repeating the experiment with the difference that 0.015 g of AH salt was added to the benzyl alcohol. The factor was calculated from the weight of AH salt: [volume used—blank: 131.2].

The sample determination was carried out by repeating the experiment with 0.5 g of the polyamide to be investigated.

The carboxyl end-group content was then calculated in mmol/kg from [volume used—blank]×factor:weight.

Amino end-group determinations were carried out by acidimetric titration (in duplicate). To do this, initially the blank and factor were determined, and then the measurement was repeated with the polyamide to be investigated and, from this, the end-group content was found.

The blank was determined by refluxing 25 ml of a solvent mixture (1000 g of analytical grade phenol/540 g of analytical grade methanol/1 ml of 0.1M methanolic KOH solution) on a magnetic stirrer at 150°–160° C. for 25 minutes. After the mixture had cooled to tepidity, 2 drops of indicator (0.1 g of benzyl orange/10 ml of analytical grade methanol made up to 100 ml with ethylene glycol, +500 mg of methylene blue/5 ml of analytical grade methanol made up to 50 ml with ethylene glycol) were added to the solvent mixture, which was then titrated with the titration solution (3.44 ml of 70% by weight perchloric acid/200 ml of analytical grade methanol made up to 2000 ml with ethylene glycol) until the color changed from green to gray.

The factor was determined by repeating the experiment with 25 ml of factor solution (0.16 g of dried AH salt dissolved in 500 ml of solvent mixture) in place of the pure solvent mixture. The factor was then calculated from the weight of AH salt: [volume used—blank: 131.2].

The sample determination was carried out by repeating the experiment with 0.5 g of the polyamide to be investigated dissolved in 25 ml of the solvent mixture.

The amino end-group content was then calculated in mmol/kg from [volume used—blank]×factor:weight.

The melt viscosity was determined in a rotational viscometer (Haake RV2) at 270° C.

Molecular weights (MW) were calculated from the end-group contents (in mmol/kg) using $$MW(\text{Polymer}) = \left[ 1 : \frac{\text{Total end-group concentration}}{2} \right] \times 10^6 \ [g/mol]$$

The solution viscosity is given by the viscosity number VN which indicates the relative increase in the viscosity of a solvent by 0.1–1.0 g/100 ml dissolved polymer divided by the concentration in g/100 ml. The viscosity numbers increase with the degree of polymerization.

$$VN = \left( \frac{\eta}{\eta_o} - 1 \right) \cdot \frac{1}{c}$$

$\frac{\eta}{\eta_o}$ = viscosity ratio with $\eta$ = viscosity of the polymer solution of defined concentration $\eta_o$ = viscosity of the solvent.

The solution viscosity was determined at 25° C.

The extract content was determined by refluxing 10 g of the particular polyamide in 150 ml of methanol for 16 h.

The still hot sample (about 50°–60° C.) was then filtered through a fluted filter to remove solids, washing the residue on the filter 3 times with 25 ml of methanol each time. The filtrate was then introduced into an analytically weighed flat-bottomed flask containing several glass beads and evaporated in an oil bath at a maximum of 110° C. The extract remaining in the flask was then, after the outside of the flask had been thoroughly cleaned, placed in a vacuum oven at 60° C. under waterpump vacuum (20–30 Torr) for 2 h to remove adherent methanol and was then cooled in a desiccator and finally weighed on an analytical balance.

EXAMPLE 1

20.4 l/h caprolactam melt at 80° C., with a water content of 2% by weight, was fed by pump from a heated receiver while flushing with nitrogen under a pressure of 1050 mbar into a heated heat exchanger with an exchanger area of 6 m$^2$ and an inlet temperature of 270° C. and heated to 260° C. within 2 minutes. The pressure on the delivery side of the pump was 15 bar; the material fed in comprised a single liquid phase.

The solution fed in was continuously pumped through a cylindrical pipe which had a length of 5000 mm and an internal diameter of 130 mm and was packed with 5 mm Raschig rings with bar, the average residence time being 2.5 h.

The cylindrical pipe was heated to 270° C. with a heat-transfer oil. The product temperature at the end of the pipe was 270° C. The pressure under which the reaction mixture still comprised a single liquid phase was 10 bar. The product removed under pressure at the end of the cylindrical pipe was characterized by the following analytical data: viscosity number (measured as 0.55% by weight solution in 96% by weight sulfuric acid)=57 ml/g; acid end-groups=157 mmol/kg; amino end-groups=155 mmol/kg; extract=10.5%; melt viscosity (single liquid phase under pressure at 270° C. in the rotational viscometer)=280 mPas.

The reaction mixture was continuously decompressed through a control valve into a heated separator at atmospheric pressure, whereupon the mixture separated into two phases and cooled by 8° C. to 262° C. owing to adiabatic vaporization of water.

The bottom of the separator contained a molten prepolymer characterized by the following analytical data: viscosity number (measured as 0.55% by weight solution in 96% by weight sulfuric acid)=81 ml/g; acid end-groups=99 mmol/kg; amino end-groups=102 mmol/kg; extract=9.7%; melt viscosity (270° C.)=350 mPas.

The vapors comprised 70% by weight water and 30% by weight steam-volatile constituents (the composition was determined from the refractive index of the lactam content in the condensate at 25° C., on the basis of a reference plot with various caprolactam/water ratios) and were removed at the top of the separator, then liquefied in a condenser and subsequently used to prepare the starting mixture.

After a residence time of 5 minutes, the prepolymer melt was continuously discharged, using a melt pump, from the separator in the form of profiles through a nozzle into a waterbath, solidifed in the waterbath and granulated. The prepolymer produced in this way was subsequently subjected to countercurrent extraction with water as in the prior art (see DD-A 206 999) and heat treated until the molecular weight reached 28500 g/mol.

EXAMPLE 2

20.4 l/h caprolactam melt at 80° C., with a water content of 2% by weight, was fed by pump from a heated receiver while flushing with nitrogen under a pressure of 1050 mbar into a heated heat exchanger with an exchanger area of 6 m$^2$ and an inlet temperature of 270° C. and heated to 260° C. within 2 minutes. The pressure on the delivery side of the pump was 15 bar; the material fed in comprised a single liquid phase.

The solution fed in was continuously pumped through a cylindrical pipe which had a length of 5000 mm and an internal diameter of 130 mm and was packed with 5 mm Raschig rings with bar, the average residence time being 2.5 h.

The cylindrical pipe was heated to 270° C. with a heat-transfer oil. The product temperature at the end of the pipe was 270° C. The pressure under which the reaction mixture still comprised a single liquid phase was 10 bar. The product removed under pressure at the end of the cylindrical pipe was characterized by the following analytical data:
viscosity number (measured as 0.55% by weight solution in 96% by weight sulfuric acid)=53 ml/g; acid end-groups=162 mmol/kg; amino end-groups=158 mmol/kg; extract=10.4%; melt viscosity (single liquid phase under pressure at 270° C.)=260 mPas.

The reaction mixture was continuously decompressed through a control valve into a heated separator at atmospheric pressure, whereupon it separated into two phases. At this point, superheated steam was passed into the melt isothermally (270° C.) through an introduction pipe, whereupon caprolactam and other steam-volatile constituents as well as part of the caprolactam oligomers were removed with the steam.

The bottom of the separator contained a molten prepolymer characterized by the following analytical data:
viscosity number (measures as 0.55% by weight solution in 96% by weight sulfuric acid)=91 ml/g; amino end-groups= 95 mmol/kg; extract=4.8%.

The vapors comprise 80% by weight water and 20% by weight steam-volatile constituents and were removed at the top of the separator and fractionated in a column. The bottom product in the column was used to prepare the initial mixture and the top product was heated to 270° C. and returned to the second part of the reactor.

The prepolymer was continuously discharged from the separator, using a melt pump, in the form of melt profiles through a nozzle into a waterbath, solidifed in the waterbath and granulated. The prepolymer produced in this way was then subjected to countercurrent extraction with water as in the prior art (see DD-A 206 999) and heat-treated until the molecular weight reached 33500 g/mol (VN=250 ml/g (measured as 0.55% by weight solution in 96% by weight sulfuric acid), total end-group concentration=60 mmol/kg).

EXAMPLE 3

20.4 l/h caprolactam melt at 80° C., with a water content of 2% by weight, was fed by pump from a heated receiver while flushing with nitrogen under a pressure of 1050 mbar into a heated heat exchanger with an exchanger area of 6 m$^2$ and an inlet temperature of 270° C. and heated to 260° C. within 2 minutes. The pressure on the delivery side of the pump was 15 bar; the material fed in comprised a single liquid phase.

The solution fed in was continuously pumped through a cylindrical pipe which had a length of 5000 mm and an internal diameter of 130 mm and was packed with 5 mm Raschig rings with bar, the average residence time being 2.5 h.

The cylindrical pipe was heated to 270° C. with a heat-transfer oil. The product temperature at the end of the pipe was 270° C. The pressure under which the reaction mixture still comprised a single liquid phase was 10 bar. The product removed under pressure at the end of the cylindrical pipe was characterized by the following analytical data:
viscosity number (measured as 0.55% by weight solution in 96% by weight sulfuric acid)=55 ml/g; acid end-groups=162 mmol/kg; amino end-groups=158 mmol/kg; extract=10.4%; melt viscosity (single liquid phase under pressure at 270° C.)=280 mPas.

The reaction mixture was continuously decompressed through a control valve into a heated separator at 90 mbar, whereupon the mixture separated into two phases and cooled by 12° C. to 258° C. owing to adiabatic vaporization of water.

The bottom of the separator contained a molten prepolymer characterized by the following analytical data:
viscosity number (measured as 0.55% by weight solution in 96% by weight sulfuric acid)=75 ml/g; acid end-groups=117 mmol/kg; amino end-groups=121 mmol/kg; extract=2.5%

The vapors comprised 42% by weight water and 58% by weight steam-volatile constituents and were removed at the head of the separator and then liquefied in a condenser and subsequently used to prepare the initial mixture.

The prepolymer was continuously discharged, using a melt pump, from the separator in the form of melt profiles through a nozzle into a waterbath, solidifed in the waterbath and granulated. The prepolymer produced in this way was subsequently subjected to countercurrent extraction with water as in the prior art (see DD-A 206 999) and heat treated until a viscosity number of 192 ml/g was reached.

EXAMPLE 4

Extraction with Methanol

In each case 10 g of low molecular weight polycaprolactam (A) (produced as in Example 1 but with the difference that 0.15% by weight of propionic acid, based on the total weight of the monomers, was added to the monomer mixture) and 10 g of high molecular weight polycaprolactam (B) (obtained by reacting caprolactam with 0.5% by weight water, with a residence time of 13 h in the precondensation pipe, the top temperature being 259° C. and the pipe temperature being 260°–280° C.) were refluxed in 150 ml of methanol for a defined time (see Table 2).

The still hot sample (about 50°–60° C.) was then filtered through a fluted filter to remove solids, washing the residue on the filter 3 times with 25 ml of methanol each time. The filtrate was then stirred into an analytically weighed flat-bottomed flask containing several glass beads and evaporated in an oil bath at a maximum of 110° C. The extract remaining in the flask was then, after the outside of the flask had been thoroughly cleaned, placed in a vacuum oven at 60° C. under waterpump vacuum (20–30 Torr) for 2 h to remove adherent methanol and was then cooled in a desiccator and finally weighed on an analytical balance.

TABLE 1

Analytical data on the extraction samples

|  | Sample A | Sample B |
| --- | --- | --- |
| Viscosity number ml/g | 67 | 158 |
| Molecular mass g/mol | 8100 | 22000 |

TABLE 2

Comparison of the samples on extraction with methanol

| Extraction time/h | Sample A | Sample B |
| --- | --- | --- |
| 0 | 0 | 0 |
| 0.5 | 9.4 | 8.4 |
| 1 | 9.6 | 8.2 |
| 2 | 10.0 | 8.5 |
| 3 | 10.0 | 9.5 |
| 5 | 10.1 | 9.7 |
| 6 | 10.3 | 9.7 |
| 7 | 10.2 | 9.8 |
| 9 | 10.4 | 10.0 |
| 12 | 10.3 | 9.9 |
| 16 | 10.3 | 10.0 |
| 20 | 10.3 | 10.3 |

The extraction time until a constant figure was reached was 6–7 h for the low molecular weight sample A but 20 h for sample B.

EXAMPLE 5

Extraction with Water

The experiment of Example 4 was repeated by using water in place of methanol as extractant.

TABLE 3

Analytical data on the extraction samples

|  | Sample A | Sample B |
| --- | --- | --- |
| Viscosity number ml/g | 67 | 158 |
| Molecular mass g/mol | 8100 | 22000 |

TABLE 4

Comparison of the samples on extraction with water

| Extraction time/h | Sample A | Sample B |
| --- | --- | --- |
| 0 | 0 | 0 |
| 0.5 | 4.1 | 3.0 |
| 2 | 7.3 | — |
| 3 | 8.0 | 6.3 |
| 5 | 8.9 | 8.2 |
| 6 | 9.6 | 8.6 |
| 7 | 9.7 | 8.6 |
| 9 | — | 8.6 |
| 12 | — | 9.0 |
| 16 | 9.7 | 9.3 |
| 20 | — | 9.7 |

The extraction time until a constant figure was reached was 6–7 h for the low molecular weight sample A but 20 h for sample B.

We claim:

1. A process for the continuous production of polyamides from a mixture of at least one lactam and water and, optionally, other monomer units and/or conventional additives and fillers under polyamide-forming conditions, where the mixture of the starting materials is heated in liquid phase in a first reaction zone until a conversion of at least 70% is reached, and undergoes adiabatic decompression and further polymerization in another reaction zone, wherein, in the first reaction zone, 0.5–7% by weight of water are employed, the temperature is increased to the range from 220° to 310° C., and polymerization is carried out until a conversion of at least 85% is reached and, in the second reaction zone, after the decompression further polymerization is carried out in the range from 215° to 300° C. without heat input.

2. A process as defined in claim 1, wherein the residence time in the first reaction zone is maintained at 2–4 hours.

3. A process as claimed in claim 1, wherein the melt after the second reaction zone is converted to the solid phase, and the volatiles are returned to the first reaction zone.

4. A process as claimed in claim 1, wherein the reaction mixture under pressure from the first reaction zone is decompressed in the second reaction zone to a pressure in the range from 0.1 mbar to 1.1 bar.

5. A process as defined in claim 1, wherein the temperature in the second reaction zone is 5°–20° C. lower than in the first reaction zone.

6. Polycaprolactam obtained after the first reaction zone in the process of claim 1, said polycaprolactam having a molecular weight in the range from 3000 to 9000 g/mol.

7. Polycaprolactam obtained after the second reaction zone in the process of claim 1, said polycaprolactam having a molecular weight in the range from 6000 to 12000 g/mol.

8. A method of producing high molecular weight polycaprolactam using the polycaprolactam as defined in claim 6.

9. A method of producing granular polycaprolactam using the polycaprolactam as defined in claim 6.

10. A process for the production of higher molecular weight polycaprolactam by polycondensation of lower molecular weight polycaprolactam, which comprises extracting the polycaprolactam as defined in claim 6 in the gas phase and simultaneously condensing in solid phase or extracting said polycaprolactam in a conventional manner and subsequently condensing in solid phase.

11. A process for the production of higher molecular weight polycaprolactam by polycondensation of low molecular weight polycaprolactam, which comprises extracting the polycaprolactam as defined in claim 7 in the gas phase and simultaneously condensing in solid phase or extracting said polycaprolactam in a conventional manner and subsequently condensing in solid phase.

12. A process for the production of higher molecular weight polycaprolactam by polycondensation of lower molecular weight polycaprolactam, which comprises extracting the polycaprolactam produced by the process of claim 1 in the gas phase and simultaneously condensing in solid phase or extracting said polycaprolactam in a conventional manner and subsequently condensing in solid phase.

13. A process as defined in claim 1, wherein the pressure in the first zone is from 8 to 18 bar.

* * * * *

UNITED STATES PATENT AND TRADEMARK OFFICE
CERTIFICATE OF CORRECTION

PATENT NO.: 5,674,973

DATED: October 7, 1997

INVENTOR(S): PIPPER et al.

It is certified that error appears in the above-identified patent and that said Letters Patent is hereby corrected as shown below:

On the cover page, item [30], the Foreign Application Priority Data should be:

--Jun. 30, 1993    [DE]    Germany ............ 43 21 683.8.--

Signed and Sealed this

Ninth Day of December, 1997

Attest:

Attesting Officer

BRUCE LEHMAN

Commissioner of Patents and Trademarks